(12) United States Patent
Wang et al.

(10) Patent No.: US 9,723,690 B2
(45) Date of Patent: Aug. 1, 2017

(54) METHOD AND DEVICE FOR ADJUSTING INDOOR BRIGHTNESS AND SMART HOME CONTROL SYSTEM

(71) Applicant: BOE TECHNOLOGY GROUP CO., LTD., Beijing (CN)

(72) Inventors: Hong Wang, Beijing (CN); Zhenpeng Guo, Beijing (CN); Xingxing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/769,024

(22) PCT Filed: Jan. 5, 2015

(86) PCT No.: PCT/CN2015/070112
§ 371 (c)(1),
(2) Date: Aug. 19, 2015

(87) PCT Pub. No.: WO2016/037454
PCT Pub. Date: Mar. 17, 2016

(65) Prior Publication Data
US 2016/0255701 A1 Sep. 1, 2016

(30) Foreign Application Priority Data
Sep. 10, 2014 (CN) .......................... 2014 1 0458183

(51) Int. Cl.
*H05B 37/02* (2006.01)
*G05B 15/02* (2006.01)
(Continued)

(52) U.S. Cl.
CPC ......... *H05B 37/0218* (2013.01); *G05B 15/02* (2013.01); *G09G 3/00* (2013.01);
(Continued)

(58) Field of Classification Search
None
See application file for complete search history.

(56) References Cited

U.S. PATENT DOCUMENTS

| 6,437,760 B1 * | 8/2002 | Simpson | G02B 27/01 |
| | | | 345/207 |
| 8,810,615 B2 * | 8/2014 | Takahashi | G09G 3/3611 |
| | | | 345/691 |

(Continued)

FOREIGN PATENT DOCUMENTS

| CN | 1039694 A | 2/1990 |
| CN | 1367637 | * 9/2002 |

(Continued)

OTHER PUBLICATIONS

First Chinese Office Action regarding Application No. 201 41 04581 831 dated May 23, 2016. Translation provided by Dragon Intellectual Property Law Firm.

(Continued)

*Primary Examiner* — Crystal L Hammond
(74) *Attorney, Agent, or Firm* — Harness, Dickey & Pierce, P.L.C.

(57) ABSTRACT

The present disclosure discloses a method and a device for adjusting indoor brightness and a smart home control system. The method includes: detecting a display device to obtain brightness of the display device; generating indoor brightness based on the brightness of the display device; and adjusting brightness of an indoor lighting device based on the indoor brightness.

15 Claims, 2 Drawing Sheets

(51) Int. Cl.
*H05B 33/08* (2006.01)
*G09G 3/00* (2006.01)
(52) U.S. Cl.
CPC ..... *H05B 33/0845* (2013.01); *H05B 33/0854* (2013.01); *H05B 37/0281* (2013.01); *Y02B 20/46* (2013.01); *Y02B 20/48* (2013.01)

(56) References Cited

U.S. PATENT DOCUMENTS

| | | | |
|---|---|---|---|
| 9,207,812 B2* | 12/2015 | Rattray | H04N 9/3179 |
| 9,251,738 B2* | 2/2016 | Yachida | H05B 33/0854 |
| 2004/0011595 A1* | 1/2004 | Hong | B66B 3/02 |
| | | | 187/391 |
| 2011/0074737 A1* | 3/2011 | Hsieh | G06F 3/0416 |
| | | | 345/175 |
| 2012/0086344 A1* | 4/2012 | Schuch | G02F 1/133603 |
| | | | 315/152 |

FOREIGN PATENT DOCUMENTS

| | | |
|---|---|---|
| CN | 1367637 A | 9/2002 |
| CN | 1577480 A | 2/2005 |
| CN | 101516150 A | 8/2009 |
| CN | 101567171 A | 10/2009 |
| CN | 101574019 A | 11/2009 |
| CN | 102402942 A | 4/2012 |
| CN | 102438357 * | 5/2012 |
| CN | 102438357 A | 5/2012 |
| CN | 102469659 A | 5/2012 |
| CN | 102522074 A | 6/2012 |
| CN | 102903376 A | 1/2013 |
| CN | 103905754 A | 7/2014 |
| JP | H07142174 A | 6/1995 |
| JP | 2010113301 A | 5/2010 |
| WO | WO-2007119277 A1 | 10/2007 |

OTHER PUBLICATIONS

Written Opinion of the International Searching Authority for International Application No. PCT/CN2015/070112.
Second Office Action regarding Chinese application No. 201410458183.1, dated Oct. 20, 2016. Translation provided by Dragon Intellectual Property Law Firm.
Ecologicalization in Food Processing, 68-70, (2016). Translation provided by Dragon Intellectual Property Law Firm.

* cited by examiner

METHOD AND DEVICE FOR ADJUSTING INDOOR BRIGHTNESS AND SMART HOME CONTROL SYSTEM

CROSS-REFERENCE TO RELATED APPLICATION

This application is the U.S. national phase of PCT Application No. PCT/CN2015/070112 filed on Jan. 5, 2015, which claims a priority to Chinese Patent Application No. 201410458183.1 filed on Sep. 10, 2014, the disclosures of which are incorporated in their entirety by reference herein.

TECHNICAL FIELD

The present disclosure relates to the field of lighting control technology, in particular to a method and a device for adjusting indoor brightness and a smart home control system.

BACKGROUND

The human eyes may take a period of time to adapt to brightness variation from one lighter image to one darker image displayed on a display device; similarly, the human eyes may also take a period of time to adapt to brightness variation from one darker image to one lighter image displayed on the display device. Generally, a process that the human eyes adapt to variations between light and dark is called as brightness adaption. One process that the human eyes adapt to variation from light to dark is called as dark adaption, and one process that the human eyes adapt to variation from dark to light is called as light adaption. The process of light adaption lasts for only a few seconds (generally less than one minute); however, the process of dark adaption may last for a relative long period of time. According to different initial brightness, the dark adaption of the human eyes may generally last for more than 5 minutes.

When a user watches a display device, screen brightness of the display device may vary in real time along with variations of contents displayed on the display device. When the user watches the display device indoors, the indoor brightness remains unchanged and cannot be adjusted, therefore, when there is a large contrast between the screen brightness of the display device and the indoor brightness, the pupils need to keep adjusting to adapt to the screen brightness of the display device and the indoor brightness simultaneously, so as to adapt to variations from light to dark and from dark to light, which will certainly lead to that the adjustment of the pupils lags behind the brightness variations. At this point, the screen brightness variations of the display device will make a great irritation to the human eyes, thereby harming the human eyes.

SUMMARY

The present disclosure provides a method and a device for adjusting indoor brightness and a smart home control system, so as to reduce the irritation to the human eyes caused by screen brightness variations of a display device, thereby reducing the harm made to the human eyes.

To achieve the above objective, a method for adjusting indoor brightness is provided in the present disclosure, and includes:

detecting a display device to obtain brightness of the display device;

generating indoor brightness based on the brightness of the display device; and adjusting brightness of an indoor lighting device based on the indoor brightness.

Alternatively, the step of detecting a display device to obtain brightness of the display device includes: detecting the display device at a set time interval $t_0$ to obtain brightness of the display device at a plurality of time points.

Alternatively, the step of generating indoor brightness based on the brightness of the display device includes:

calculating a weighted average of the brightness of the display device at the plurality of time points, to generate brightness of the display device at a next time point; and multiplying the brightness of the display device at the next time point by a preset brightness coefficient, to generate the indoor brightness.

Alternatively, the set time interval $t_0$ is equal to N/F, where N is a positive integer, and F is a refresh frequency or refresh frame frequency.

Alternatively, the step of adjusting brightness of an indoor lighting device based on the indoor brightness includes:

looking up brightness level corresponding to the indoor brightness from a preset brightness correspondence table which includes correspondence between indoor brightness and brightness levels; and adjusting the brightness of the indoor lighting device to the brightness level corresponding to the indoor brightness.

To achieve the above objective, a device for adjusting indoor brightness is provided in the present disclosure, and includes:

a detection module, configured to detect a display device to obtain brightness of the display device;

a generation module, configured to generate indoor brightness based on the brightness of the display device; and an adjustment module, configured to adjust brightness of an indoor lighting device based on the indoor brightness.

Alternatively, the detection module is configured to detect the display device at a set time interval $t_0$ to obtain brightness of the display device at a plurality of time points.

Alternatively, the generation module includes:

a first generation sub-module, configured to calculate a weighted average of the brightness of the display device at the plurality of time points, to generate brightness of the display device at a next time point; and a second generation sub-module, configured to multiply the brightness of the display device at the next time point by a preset brightness coefficient, to generate the indoor brightness.

Alternatively, the set time interval $t_0$ is equal to N/F, where N is a positive integer, and F is a refresh frequency or refresh frame frequency.

Alternatively, the adjustment module includes:

a lookup sub-module, configured to look up brightness level corresponding to the indoor brightness from a preset brightness correspondence table which includes correspondence between indoor brightness and brightness levels; and an adjustment sub-module, configured to adjust the brightness of the indoor lighting device to the brightness level corresponding to the indoor brightness.

To achieve the above objective, a smart home control system is provided in the present disclosure, and includes the above device for adjusting indoor brightness.

The present disclosure has the following beneficial effects.

In the technical schemes of the method and the device for adjusting indoor brightness and the smart home control system provided in the present disclosure, the brightness of the display device is obtained by detecting the display device, the indoor brightness is generated based on the brightness of the display device, and the brightness of the indoor lighting device is adjusted based on the indoor brightness. By the present disclosure, a real-time adjustment of the indoor brightness may be realized, so as to reduce the irritation to the human eyes caused by brightness variations of the display device, thereby reducing the harm made to the human eyes.

DETAILED DESCRIPTION

To make the technical schemes of the present disclosure better understood by those skilled in the art, a method and a device for adjusting indoor brightness and a smart home control system provided in the present disclosure will be described hereinafter in details in conjunction with drawings.

Figure 1:
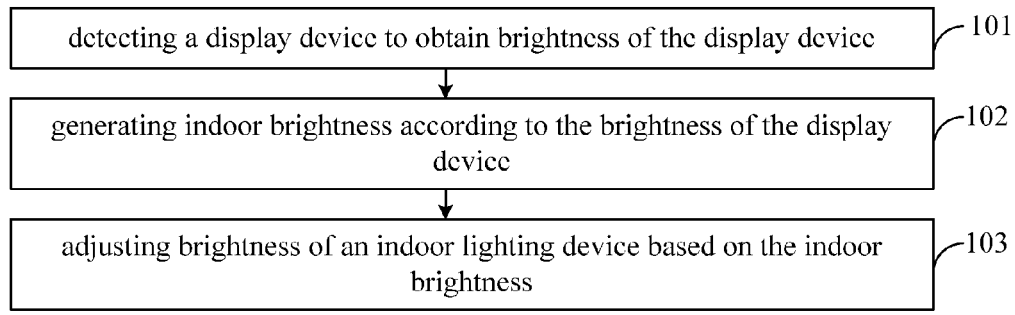
FIG. 1 is a flow chart of a method for adjusting indoor brightness according to a first embodiment of the present disclosure.

FIG. 1 is a flow chart of a method for adjusting indoor brightness according to a first embodiment of the present disclosure. As shown in FIG. 1, the method includes the following steps.

At step 101, detecting a display device to obtain brightness of the display device.

The steps of this embodiment may be implemented by a device for adjusting indoor brightness. The display device may be a liquid crystal display device or an active matrix/organic light emitting diode (AMOLED) display device.

With variations of contents displayed by the display device, the brightness of the display device may vary in real-time. This step may realize a real-time detection of the brightness of the display device. To be specific, the display device may be detected at a set time interval $t_0$, to obtain the brightness of the display device at a plurality of time points. The set time interval $t_0$ at which the brightness of the display device is detected may be set in advance. Optionally, the set time interval $t_0$ may be set according to a refresh frequency or a refresh frame frequency F of the display device. When the set time interval $t_0$ is set according to the refresh frequency or the refresh frame frequency F of the display device, the set time interval $t_0$ may be equal to N/F, where N is a positive integer. For example, when the refresh frequency or the refresh frame frequency is 60 Hz and N is equal to 1, the set time interval $t_0$ is 1/60 s.

Supposing that the display device is detected at time points $t_{n-m}, t_{n-(m-1)} \ldots t_{n-1}, t_n$ respectively according to the set time interval $t_0$, the brightness $L_D(t_{n-m}), L_D(t_{n-(m-1)}) \ldots L_D(t_{n-1}), L_D(t_n)$ of the display device at the above plurality of time points can be obtained, where $1 \le m < 2$, $n \ge 2$, and m, n are both positive integers. $t_n - t_{n-1} \ge t_0$, where $t_0$ is a constant. That is, in one embodiment, the brightness of the display device may be detected at time points with an equal time interval. However, in practical application, $t_0$ may be adjusted adaptively, and the brightness of the display device may be detected at time points with different time intervals.

At step 102, generating indoor brightness according to the brightness of the display device.

Figure 3:
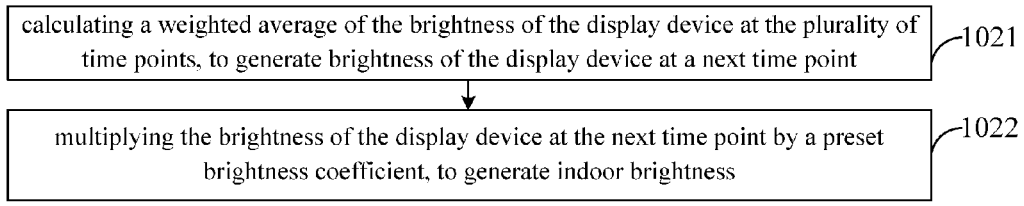
FIG. 3 is a flow chart of Step 102 shown in FIG. 1.

As shown in FIG. 3, Step 102 includes the following Step 1021 to Step 1022.

At step 1021, calculating a weighted average of the brightness of the display device at the plurality of time points, to generate brightness of the display device at a next time point.

For example, by calculating a weighted average of the brightness $L_D(t_i)$ of the display device at the continuous m time points before a next time point $t_{n+1}$, brightness $L_D(t_{n+1})$ of the display device at the next time point $t_{n+1}$ is calculated as follows:

$$L_D(t_{n+1}) = \frac{\sum_{i=n-m}^{n} L_D(t_i)}{m}$$

In this embodiment, the brightness of the display device at a next time point may be predicted based on the detected brightness of the display device at a plurality of time points. In addition, the brightness of the display device at the next time point calculated by means of the above weighted average is more even and accurate, thereby better adjusting the indoor brightness.

At step 1022, multiplying the brightness of the display device at the next time point by a preset brightness coefficient, to generate indoor brightness.

The indoor brightness $L_E(t_{n+1}) = kL_D(t_{n+1})$, where k is brightness coefficient. The brightness coefficient k may be set as needed, and k is in a range of from 0.8 to 1.2. In order to make the indoor brightness approximate to the brightness of the display device, it is better that K approximates more to 1, therefore k is optionally equal to 1.

In this embodiment, the indoor brightness may be calculated based on the predicted brightness of the display device at the next time point.

At step 103, adjusting brightness of an indoor lighting device based on the indoor brightness.

Figure 4:
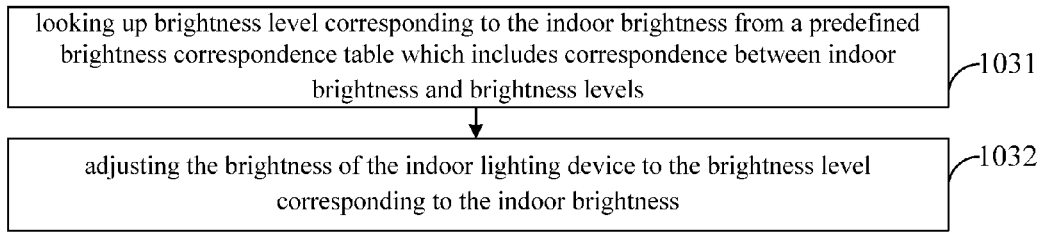
FIG. 4 is a flow chart of Step 103 shown in FIG. 1.

As shown in FIG. 4, Step 103 includes the following Step 1031 to Step 1032.

At step 1031, looking up brightness level corresponding to the indoor brightness from a predefined brightness correspondence table which includes correspondence between indoor brightness and brightness levels.

Table 1 is a preset brightness correspondence table.

TABLE 1

| brightness Level | indoor brightness $L_E$ (Lux) |
| --- | --- |
| L1 | $0.1 \le L_E \le 10$ |
| L2 | $10 < L_E \le 50$ |
| L3 | $50 < L_E \le 100$ |
| L4 | $100 < L_E \le 200$ |
| L5 | $200 < L_E \le 300$ |

In this embodiment, indoor light required to be adjusted may be classified into multiple levels, and each level corresponds to brightness level. As shown in Table 1, the indoor light required to be adjusted may be classified into 5 levels (more or less brightness levels may be set as needed). The 5 levels correspond to brightness levels L1, L2, L3, L4 and L5 respectively. Correspondence between indoor brightness and brightness levels is established in advance, to form the brightness correspondence table. For example, when the indoor brightness generated in Step 102 is 5 Lux, it may be queried out from Table 1 that the corresponding brightness level is L1.

At step 1032, adjusting the brightness of the indoor lighting device to the brightness level corresponding to the indoor brightness.

In this embodiment, the lighting device may be an incandescent light, a fluorescent light or a light emitting diode (LED) light.

In the technical schemes of the method for adjusting indoor brightness according to this embodiment, the brightness of the display device is obtained by detecting the display device, the indoor brightness is generated based on the brightness of the display device, the brightness level is obtained by looking up a table based on the indoor brightness, and the brightness of the indoor lighting device is adjusted based on the brightness level obtained by looking up the table. In this embodiment, a real-time adjustment of the indoor brightness may be realized, so as to reduce the irritation to human eyes caused by the brightness variation of the display device, thereby reducing the harm made to the human eyes.

Figure 2:
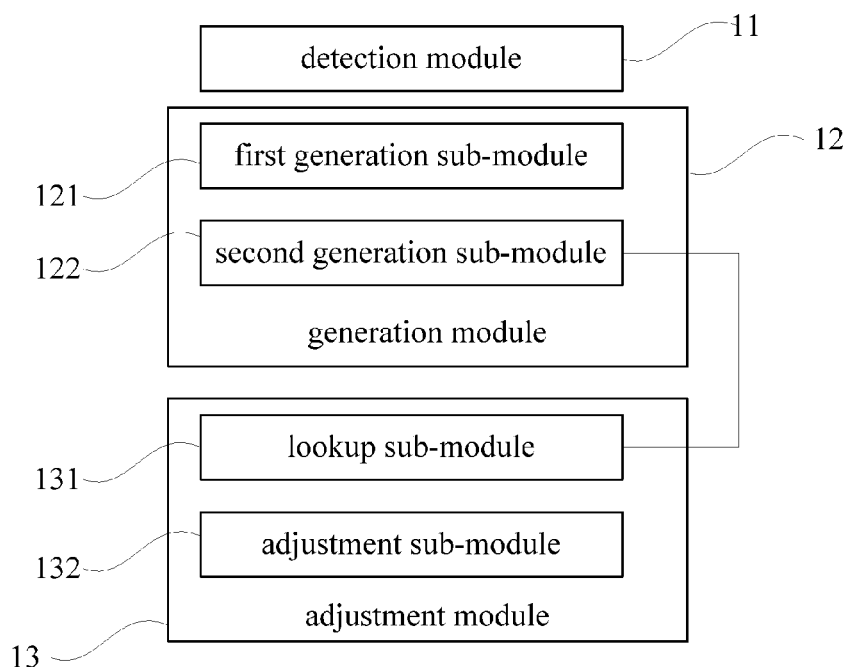
FIG. 2 is a schematic view showing a structure of a device for adjusting indoor brightness according to a second embodiment of the present disclosure.

FIG. 2 is a schematic view showing a structure of a device for adjusting indoor brightness according to a second embodiment of the present disclosure. As shown in FIG. 2, the device includes a detection module 11, a generation module 12 and an adjustment module 13. The detection module 11, the generation module 12 and the adjustment module 13 are connected in sequence, and the adjustment module 13 is further connected to an indoor lighting device.

The detection module 11 is configured to detect a display device to obtain brightness of the display device. Optionally, the detection module 11 is configured to detect the display device at a set time interval $t_0$, to obtain the brightness of the display device at a plurality of time points. Optionally, the set time interval $t_0$ is equal to N/F, where N is a positive integer, and F is a refresh frequency or refresh frame frequency. In this embodiment, the detection module 11 may be a luminance colorimeter or a charge-coupled device (CCD) image sensor. The detection module 11 may be arranged at a position close to a display screen of the display device, e.g., surroundings of the display screen, so as to detect more accurately the brightness of the display device.

The generation module 12 is configured to generate indoor brightness based on the brightness of the display device. To be specific, the generation module 12 includes a first generation sub-module 121 and a second generation sub-module 122. The first generation sub-module 121 is connected to the detection module 11 and the second generation sub-module 122, respectively. The first generation sub-module 121 is configured to calculate a weighted average of the brightness of the display device at a plurality of time points, to generate brightness of the display device at a next time point. The second generation sub-module 122 is configured to multiply the brightness of the display device at the next time point by a preset brightness coefficient, to generate the indoor brightness.

The adjustment module 13 is configured to adjust brightness of an indoor lighting device based on the indoor brightness. To be specific, the adjustment module 13 includes a lookup sub-module 131 and an adjustment sub-module 132. The lookup sub-module 131 is connected to the second generation sub-module 122 and the adjustment sub-module 132 respectively, and the adjustment sub-module 131 is further connected to the indoor lighting device. The lookup sub-module 131 is configured to look up brightness level corresponding to the indoor brightness from a preset brightness correspondence table which includes a correspondence between indoor brightness and brightness levels. The adjustment sub-module 132 is configured to adjust the brightness of the indoor lighting device to the brightness level corresponding to the indoor brightness.

When the device for adjusting indoor brightness according to this embodiment is applied to an indoor environment provided with a smart home control system, the device for adjusting indoor brightness may be set separately or set in the smart home control system.

The device for adjusting indoor brightness according to this embodiment may be used to implement the method for adjusting indoor brightness according to the first embodiment, and the detailed description thereof may refer to the first embodiment and will not be repeated here.

By the device for adjusting indoor brightness according to this embodiment, brightness of a display device is obtained by detecting the display device, indoor brightness is generated based on the brightness of the display device, and brightness of an indoor lighting device is adjusted based on the indoor brightness. In this embodiment, a real-time adjustment of indoor brightness may be realized, so as to reduce the irritation to the human eyes caused by the brightness variation of the display device, thereby reducing the harm made to the human eyes.

A smart home control system is provided according to a third embodiment of the present disclosure. The smart home control system includes the device for adjusting indoor brightness provided in the second embodiment, and the detailed description thereof may refer to the second embodiment.

By the smart home control system according to this embodiment, brightness of a display device is obtained by detecting the display device, indoor brightness is generated based on the brightness of the display device, and brightness of an indoor lighting device is adjusted based on the indoor brightness. In this embodiment, a real-time adjustment of indoor brightness may be realized, so as to reduce the irritation to the human eyes caused by the brightness variation of display device, thereby reducing the harm made to the human eyes.

It may be understood that the above embodiments are merely exemplary embodiments of the present disclosure for illustrating the principle of the present disclosure, and the present disclosure is not limited thereto. Those skilled in the art may make various modifications and improvements without departing from the spirit and essence of the present disclosure, and these modifications and improvements may also fall into the scope of the present disclosure.

What is claimed is:

1. A method for adjusting indoor brightness, comprising:
   detecting a display device to obtain brightness of the display device;
   calculating indoor brightness based on the brightness of the display device; and
   adjusting brightness of an indoor lighting device based on the calculated indoor brightness.

2. The method according to claim 1, wherein the step of detecting a display device to obtain brightness of the display device comprises:

detecting the display device at a set time interval $t_o$ to obtain brightness of the display device at a plurality of time points.

3. The method according to claim 2, wherein the step of calculating indoor brightness based on the brightness of the display device comprises:

calculating a weighted average of the brightness of the display device at the plurality of time points, to calculate brightness of the display device at a next time point; and multiplying the brightness of the display device at the next time point by a preset brightness coefficient, to calculate the indoor brightness.

4. The method according to claim 2, wherein the set time interval $t_0$ is equal to N/F, where N is a positive integer, and F is a refresh frequency or refresh frame frequency.

5. The method according to claim 1, wherein the step of adjusting brightness of an indoor lighting device based on the calculated indoor brightness comprises:

looking up brightness level corresponding to the calculated indoor brightness from a preset brightness correspondence table which comprises correspondence between indoor brightness and brightness levels; and adjusting the brightness of the indoor lighting device to the brightness level corresponding to the calculated indoor brightness.

6. A device for adjusting indoor brightness, comprising:
a detection module, configured to detect a display device to obtain brightness of the display device;
a generation module, configured to calculate indoor brightness based on the brightness of the display device; and
an adjustment module, configured to adjust brightness of an indoor lighting device based on the calculated indoor brightness.

7. The device according to claim 6, wherein the detection module is further configured to detect the display device at a set time interval $t_0$ to obtain brightness of the display device at a plurality of time points.

8. The device according to claim 7, wherein the generation module comprises:

a first generation sub-module, configured to calculate a weighted average of the brightness of the display device at the plurality of time points, to calculate brightness of the display device at a next time point; and a second generation sub-module, configured to multiply the brightness of the display device at the next time point by a preset brightness coefficient, to calculate the indoor brightness.

9. The device according to claim 7, wherein the set time interval $t_0$ is equal to N/F, where N is a positive integer, and F is a refresh frequency or refresh frame frequency.

10. The device according to claim 6, wherein the adjustment module comprises:

a lookup sub-module, configured to look up brightness level corresponding to the calculated indoor brightness from a preset brightness correspondence table which comprises correspondence between indoor brightness and brightness levels; and an adjustment sub-module, configured to adjust the brightness of the indoor lighting device to the brightness level corresponding to the calculated indoor brightness.

11. A smart home control system, comprising a device for adjusting indoor brightness;

wherein the device for adjusting indoor brightness comprises:

a detection module, configured to detect a display device to obtain brightness of the display device;

a generation module, configured to calculate indoor brightness based on the brightness of the display device; and an adjustment module, configured to adjust brightness of an indoor lighting device based on the calculated indoor brightness.

12. The system according to claim 11, wherein the detection module is further configured to detect the display device at a set time interval $t_0$ to obtain brightness of the display device at a plurality of time points.

13. The system according to claim 12, wherein the generation module comprises:

a first generation sub-module, configured to calculate a weighted average of the brightness of the display device at the plurality of time points, to calculate brightness of the display device at a next time point; and a second generation sub-module, configured to multiply the brightness of the display device at the next time point by a preset brightness coefficient, to calculate the indoor brightness.

14. The system according to claim 12, wherein the set time interval $t_0$ is equal to N/F, where N is a positive integer, and F is a refresh frequency or refresh frame frequency.

15. The system according to claim 11, wherein the adjustment module comprises:

a lookup sub-module, configured to look up brightness level corresponding to the calculated indoor brightness from a preset brightness correspondence table which comprises correspondence between indoor brightness and brightness levels; and an adjustment sub-module, configured to adjust the brightness of the indoor lighting device to the brightness level corresponding to the calculated indoor brightness.

\* \* \* \* \*